INVENTOR.
William C. Brasie
BY Robert B. Ingraham
AGENT

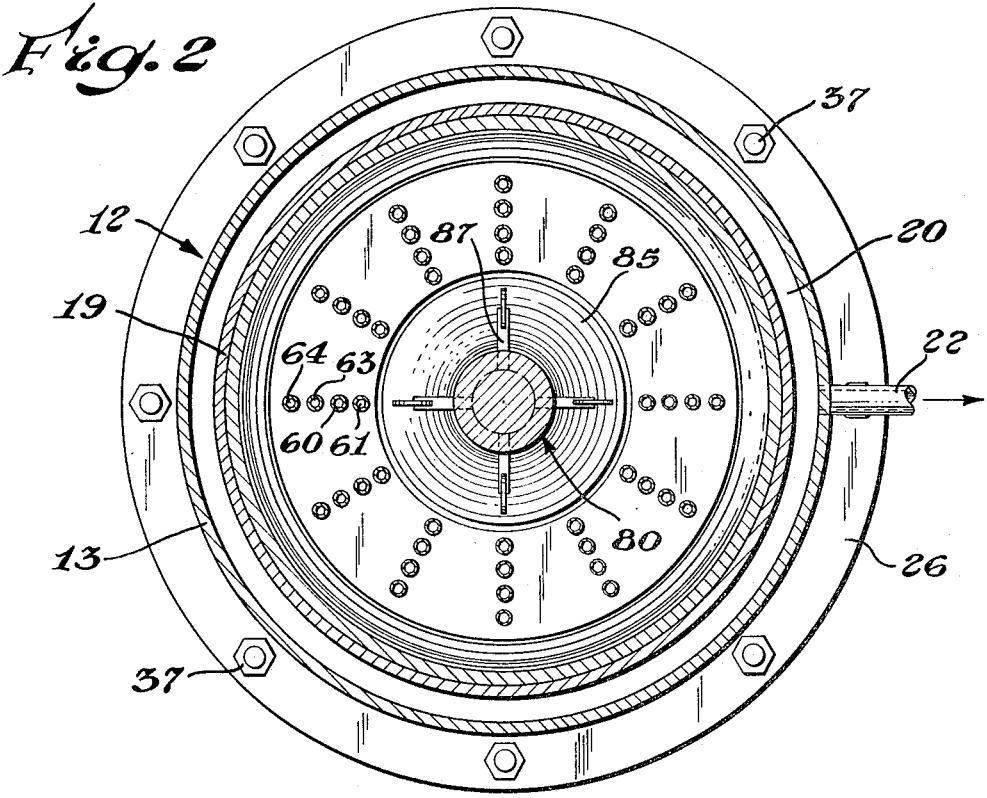
Fig. 2
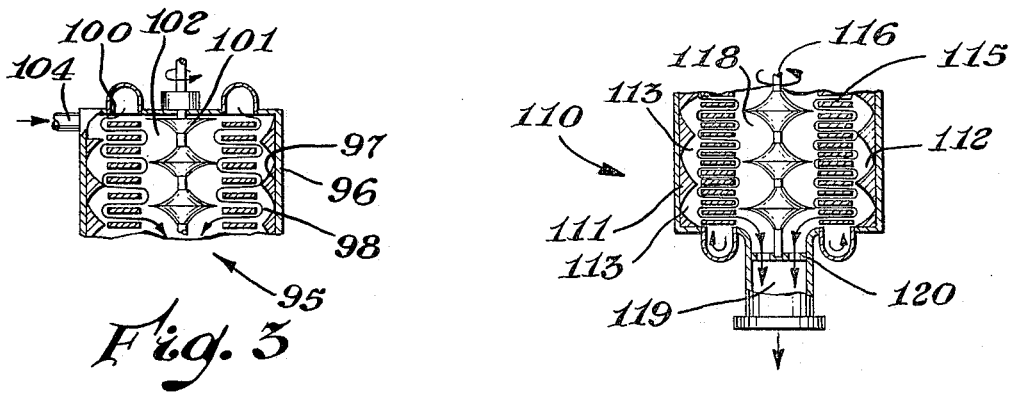
Fig. 3
Fig. 4
INVENTOR.
William C. Brasie
BY Robert B. Ingraham
AGENT

United States Patent Office 3,280,899
Patented Oct. 25, 1966

3,280,899
HEAT EXCHANGE AGITATOR
William C. Brasie, Austin, Tex., assignor to The Dow Chemical Company, Midland, Mich., a corporation of Delaware
Filed Mar. 22, 1965, Ser. No. 441,661
8 Claims. (Cl. 165—109)

This invention relates to an agitated vessel and is more particularly concerned with an agitated vessel having improved heat exchange capabilities.

Oftentimes in the processing of viscous liquid or liquids which become viscous during the processing, proper heat exchange becomes difficult because of the very high viscosity of the material being treated and lack of turbulent flow. Oftentimes it is desirable that turbulence and shear be a minimum while heat exchange capabilities be maintained at a maximum within a minimum volume. A particularly vexatious problem is that of the mass polymerization of materials such as styrene and rubber wherein a solution or dispersion of rubber in styrene monomer is prepared and the mixture heated to a temperature sufficient to convert the mixture to a thermoplastic resinous material. If such a reaction is carried in a vessel, the heat of polymerization oftentimes will cause portions of the reaction mixture to reach a temperature sufficiently high to cause cross-linking or sometimes depolymerization depending upon the particular reactants employed. In many instances, it is critical to maintain a substantially constant temperature throughout the reaction mixture in order that the molecular weight or distribution is maintained within the desired range. Further, many such reactions, whether exothermic or endothermic, desirably are carried out in a continuous manner which would minimize short circuiting, that is flow from the inlet to the outlet without having the desired residence of time within the treating region.

It would be particularly advantageous if there were available an agitated vessel wtih excellent heat exchange characteristics capable of handling highly viscous materials such as molten polymers and the like. Also, it would be beneficial if there were available such a reaction vessel with high heat transfer characteristics which would allow agitation of the materials passing therethrough and suited for continuous processing. It would be also advantageous if such a vessel would prevent or substantially eliminate a short circuiting of the liquid or fluid being processed.

These benefits and other advantages in accordance with the present invention are achieved in an agitated vessel comprising a shell or hollow housing having at least one inlet and one outlet means remotely disposed from each other on the housing, the housing having generally circular cross-sectional configuration and defining a processing cavity therein, the housing having an inner wall defining a plurality of generally annular grooves, a multiplicity of flat plate heat exchanger members, each having a centrally disposed aperture, the plate-like members assembled perpendicularly to the longitudinal axis of the housing with a space between each of the individual plate members, the plate members being positioned in close proximity to one another to provide a flow path between adjacent members in a thin sheet, the plate members having an outside diameter about equal to the adjacent smallest diameter of the inner wall of the housing, the plate members and the annular grooves in the inner wall of the housing defining a plurality of annular spaces, each of the spaces communicating with the central apertures of the flat plate heat exchanger members by means of spaces therebetween, an agitator generally rotatable about the axis of the apertures of the heat exchange members, the agitator having a generally circular cross-sectional configuration and having formed therein a plurality of annular recesses, the maximum diameter of the agitator approximating that of the adjacent central aperture of the plate members, the annular recesses of the agitator being in staggered relationship to the annular recesses of the housing wall thereby forming a generally annular serpentine corrugated tubular flow path from the inlet to the outlet wherein the fluid passes through the flat plate heat exchanger members from the annular grooves of the housing to the annular grooves of the agitator, and alternately from the grooves of the agitator to the grooves of the housing.

These benefits and other advantages of the invention will become more apparent from the following specification when taken in connection with the drawing wherein:

FIGURE 2 is a sectional view of the vessel of FIGURE 1 taken along the line 2—2;

Figure 1:
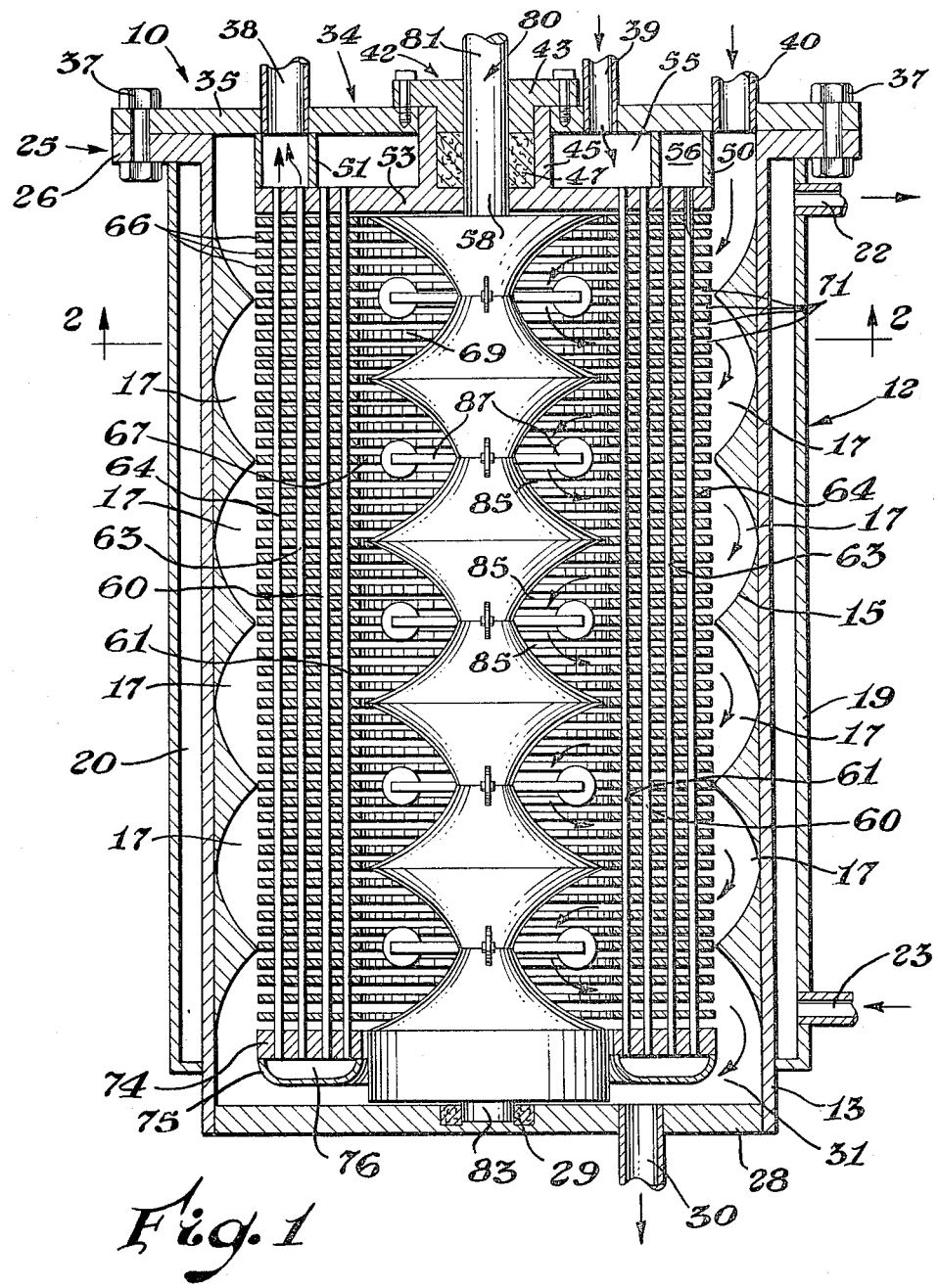
FIGURE 1 is a schematic sectional view of a heat exchanger in accordance with the present invention.

FIGURE 3 schematically depicts an alternate inlet arrangement for a vessel in accordance with the invention; and FIGURE 4 depicts an alternate outlet arrangement.

In FIGURE 1 there is illustrated a schematic sectional view of an apparatus or vessel in accordance with the invention generally designated by the reference numeral 10, the vessel 10 comprising in cooperative combination a housing or shell 12. The shell 12 comprises a generally cylindrical body portion 13 having an inner wall 15. The inner wall 15 defines a plurality of annular grooves or recesses 17. Generally adjacent external to the recess 17 is a jacket 19 defining therein an annular space 20 adapted to receive a heat exchange fluid. Heat exchange fluid passageways 22 and 23 are in communication with the space 20. The housing 12 has a first terminal end portion 25 having disposed thereon a flange 26. The housing 12 has a second terminal end portion 28 defining a bearing 29 which is axially disposed with respect to the inner surface or wall 15 or annular groove 17. The second terminal portion 28 has disposed therein a process fluid outlet 30 in operative communication with a space 31 defined by the inner wall 15 of the housing 12. Disposed within the space 31 is a heat exchange and feed assembly generally indicated by reference numeral 34. The assembly 34 comprises in cooperative combination a head or top 35 secured to the flange 26 by means of a plurality of fasteners such as bolts 37. The top 35 defines a heat exchange fluid outlet means 38, a heat exchange inlet means 39 and at least one process fluid inlet 40. The top 35 supports a centrally disposed seal and bearing generally designated by the reference numeral 42. The bearing 42 comprises a packing gland 43, an annular ring 45 serving to restrain a packing or sealing means 47. The bearing and sealing assembly 42 is substantially coaxially arranged with the bearing 29 of the terminal end portion 28. Affixed to the top 35 is a first or outer annular wall 50 and a second or inner annular wall 51. Affixed to the ring 45 and the walls 50 and 51 remote from the top 35 is a heat exchanger support plate 53. The support plate 53 in combination with the ring 45 and the wall 51 defines a heat exchanger inlet plenum 55. A heat exchange fluid outlet plenum 56 is defined by the top 35, the walls 50 and 51, and the plate 53. The plate 53 has centrally defined therein an aperture 58 generally coaxially disposed with respect to the assembly 42 and the bearing 29. A plurality of tubular members 60 and 61 extends from the plate 53 toward the second terminal end 28 and are in communication with the plenum 55. A plurality of tubular members 63 and 64 extend generally parallel to the tubular members 60 and 61 toward the terminal end 28 and are in communication with the plenum 26. A plurality of flat plate heat exchange members 66 are secured to and supported by the tubes 60, 61, 63 and 64. Each of the circular flat plates 66 defines a centrally disposed aperture 67 which in turn defines a generally cylindrical cavity 69. The adjacent plates 66 define therebetween a plurality of relatively narrow spaces 71. The tubes 60, 61, 63 and 64 are supported remotely from the plate 53 by means of the support ring 74. A heat exchange housing 75 is secured in sealing engagement to the support ring 74 and defines a plenum 76 which is in full communication with the tubes or conduits 60, 62, 63 and 64. The housing 75 is spaced from the terminal end 28 of the housing 12. An agitator 80 is disposed within the space 69. The agitator 80 comprises a shaft or drive means 81 rotatably disposed within the bearing assembly 42 and terminates in a shaft bearing portion 83 which engages the bearing 29 in the second terminal portion 28. The agitator 80 within the cavity 69 defined by the plates 66 has a generally cylindrical configuration having formed therein a plurality of annular grooves 85. The grooves 85 are arranged in an alternating manner with respect to the grooves 17 so that each of the grooves 85 is radially opposite to the portions of adjacent grooves 17. Beneficially, the grooves are displaced with respect to each other by a distance of about one-half of the total groove width, thus providing a serpentine flow path indicated by the arrows in the grooves 85 and 17. The maximum diameter of the agitator 80 within the cavity 69 approximates that of the diameters of the apertures 67 and provides for normal running clearance therein. Disposed within each of the grooves 85 of the agitator 80 are a plurality of agitating protuberances 87.

In FIGURE 2 there is illustrated a sectional view of the vessel of FIGURE 1 taken along the line 2—2 wherein the relationship of the agitating protuberances 87 is illustrated relative to the grooves 85 within the agitator. The tubes 60, 61, 63 and 64 are generally radially disposed about the axis of the housing 12 and each support flat plate 66.

Thus in the embodiment of the invention illustrated in FIGURE 1 a heat exchange fluid is passed into the passageway 39 which fills the plenum 55. The fluid passes through the tubes 60 and 61 downwardly through the plenum 76 of the housing 75, flows upwardly through the tubes 63 and 64, into the plenum 66, then is discharged through the passageway 38. The wall 13 of the vessel is heated by supplying a heat exchange fluid to the passageway 22 or 23 and removing the fluid from the remaining passageway. The process fluid is passed into the passageway 40 following the serpentine path indicated generally by the direction of the arrows and is discharged through the outlet 30. Thus, the processed fluid passes alternately through the grooves 17 to the grooves 85 and passes through the spaces 71 between the plates 66. As the agitator 80 is rotated, the fluid within the grooves 85 is further agitated and dispersed by the protuberances 87 and the fluid follows a somewhat serpentine helical path through the reactor, thus providing mixing as well as intimate contact with the heat exchange surfaces.

It should be realized that the direction of fluid flow through the reactor is one of choice depending upon the particular condition or conditions which will exist in any specific application for the reactor. Obviously, the vessel may be positioned as in FIGURE 1, it may be inverted, positioned on its side, or in any intermediate position depending upon the needs of the particular process or location in which it is employed. The relative size and depth of the grooves such as 17 and 85 and the width of the annular flat plate heat exchange members can be varied in such a manner as to provide a greater or lesser residence time within the vessel or a greater or lesser residence time of the processed fluid within the spaces 71. In a highly exothermic reaction, the grooves 85 and 17 should have minimal dimensions and the area of the plates be maximum, whereas with less stringent heat exchange or temperature control requirements, the grooves may be larger and a longer residence time obtained for a given size of vessel and heat exchange plates.

In FIGURE 3 there is schematically illustrated an alternate feed arrangement for a reactor generally designated by the reference numeral 95. The reactor 95 has an external shell 96 having an inner wall 97 defining a plurality of grooves, 98, an annular flat plate heat exchanger generally indicated by the reference number 100. An agitator 101 is centrally disposed within the heat exchanger 100 and defines a plurailty of annular grooves 102. A radial inlet port or passage 104 is disposed adjacent the uppermost portion of the reactor 95 and the resultant flow pattern is indicated schematically by the serpentine arrow. This arrangement is conveniently employed when a side feed is required.

In FIGURE 4 there is illustrated an alternate end arrangement of a vessel in accordance with the invention generally indicated by the reference numeral 110. The reactor 110 comprises a housing 11 having a generally cylindrical wall 112 which defines a plurality of annular grooves 113. An annular flat plate heat exchange assembly generally designated by the reference numeral 115 is disposed within housing 111 in a manner similar to that of FIGURE 1. An agitator 116 is centrally and axially disposed within the heat exchanger 115. The agitator 116 defines a plurality of annular grooves 118 which overlap the grooves 113 of the housing 111 to provide a serpentine flow path indicated by the arrow which is substantially similar to that depicted in FIGURE 1. The terminal portion of the housing 111 forms a process fluid passage 119 which is substantially coaxially disposed with respect to the agitator 116. The agitator bearing support 120 is disposed generally centrally within the passageway 119. The flow path within the reactor is generally indicated by the arrow.

It should be noted that in the embodiment of FIGURES 1–4 it is immaterial in which direction the process fluid passes through the vessel to obtain excellent heat exchange characteristics. However, when the process fluid is a slurry or contains solids of higher density than the fluid portion, generally it is advantageous to pass the fluid downwardly through the reactor.

Also, the apparatus is illustrated as having a generally cylindrical configuration. In certain instances, it may be desirable to employ a generally conical agitator, a cylindrical shell, and a heat exchanger wherein the central apertures decrease in diameter generally in accordance with the decrease in diameter of the rotor. Such embodiment is particularly useful in reactions which tend to be autocatalytic and the heat exchange requirements vary with the residence time. Thus, in a process which was strongly exothermic initially, the reactants are fed to the feed port adjacent the small end of the agitator wherein the serpentine path would provide a greater heat exchange area, whereas at the opposite end of the vessel the heat exchange facilities would be less in accordance with their reduced requirement. With an autocatalytic reaction, the reactants are fed to the portion of the vessel adjacent the large end of the rotor and discharge from the area of maximum heat transfer area. However, for most purposes, in view of the added difficulty of fabrication, the cylindrical configuration is usually preferred, unless the materials of construction are relatively expensive. Also, the shell or housing may be a solid piece, or the annular grooves may be formed by a plurality of inserts or collars defining suitable annular grooves. Generally, it is beneficial to maintain the annular groove of both the reactor of the vessel inner wall and of the agitator in a configuration which will permit streamline flow when liquids of high viscosity are employed.

The agitated vessel of the present invention is applicable to a wide variety of fluid process heat exchange problems and is particularly suitable for use with materials of high flow viscosities. It is readily employed with less viscous materials.

The vessel of the invention is constructed from any of the conventional construction materials, such as steel, stainless steel, aluminum, and the like, the choice being predicated upon the particular application and conditions of the application and nature of the material to be processed. Various methods are available for fabrication of the heat exchanger section. Individual plates are formed and press-fitted to the tubes, if desired, spacers may be employed to maintain uniform spacing between the plate members. The assembly is optionally welded, brazed or soldered to provide mechanical rigidity and maintain a good thermal path between the tubes and plates. Alternately, the heat exchanger assembly is machined from a solid block of metal or from mechanical tubing of suitable size. The heat exchanger fluid channels are drilled or bored and the plate members formed by slitting or milling.

As is apparent, the apparatus is susceptible of being embodied with various alterations and modifications differing particularly from that which has been described in the preceding description and specification. For this reason, it is to be fully understood that all of the foregoing is merely intended to be illustrative and is not to be construed or interpreted as being restrictive or otherwise limiting of the persent invention excepting as it is set forth and defined in the hereto appended claims.

What is claimed is:

1. An agitated vessel comprising a hollow housing having a first and a second end and at least one inlet means adjacent the first end and one outlet means adjacent the second end, the housing having a generally circular cross-sectional configuration and defining a processing cavity therein extending generally from the first end to the second end and being in communication with the inlet and outlet means, the housing having an inner wall defining a plurality of generally annular grooves, a heat exchanger assembly disposed within the processing cavity, the heat exchanger assembly comprising a multiplicity of flat plate heat exchanger members, each of the members defining a centrally disposed aperture, the plate-like members assembled perpendicularly to the longitudinal axis of the housing with a space between each of the individual plate members, the plate members being positioned in close proximity to one another to provide a flow path between adjacent members in a thin sheet-like configuration, the plate members having an outside diameter about equal to the adjacent smallest diameter of the inner wall of the housing, the plate members and the annular grooves in the inner wall housing defining a plurality of annular spaces, each of the spaces communicating with the central apertures of the flat plate heat exchanger members by means of spaced between the members, means defining a plurality of heat exchange fluid conduits passing through the plate members and maintaining the members in spaced relationship to each other, means defining a heat exchange fluid inlet and a heat exchange fluid outlet in operative association with the heat exchanging fluid conduits, an agitator generally rotatable about the axis of the apertures of the heat exchanger members, the agitator having a generally circular cross-sectional configuration and having formed therein a plurality of annular recesses, the maximum diameter of the agitator approximating that of the adjacent central aperture of the plate members, the annular recesses of the agitator being in a staggered relationship to the annular recesses of the housing wall, thereby forming a generally annular serpentine flow path from the inlet to the outlet wherein the fluid passes through the flat plate heat exchanger members from the annular grooves of the housing to the annular grooves of the agitator and alternating from the grooves of the agitator to the grooves of the housing.

2. The apparatus of claim 1 wherein mixing protuberances are disposed in the annular grooves of the agitator.

3. The apparatus of claim 1 wherein the inner wall of the housing defines a generally cylindrical configuration.

4. The apparatus of claim 1 wherein the housing has a generally hollow cylindrical configuration defining an open end closed by a top portion supporting the heat exchange assembly.

5. The apparatus of claim 1 wherein the outlet means is generally axially disposed.

6. The apparatus of claim 1 wherein the inlet means is axially disposed.

7. The apparatus of claim 1 wherein the inlet means is radially disposed.

8. The apparatus of claim 1 wherein the outlet means is radially disposed.

References Cited by the Examiner

UNITED STATES PATENTS

| 2,091,119 | 8/1937 | Saint-Jacques | 165—140 |
| 2,367,149 | 1/1945 | Smith | 165—109 X |

FOREIGN PATENTS

| 1,160,021 | 2/1958 | France. | |

ROBERT A. O'LEARY, *Primary Examiner.*

M. A. ANTONAKAS, *Assistant Examiner.*